US011275777B2

(12) United States Patent
Ackermann et al.

(10) Patent No.: US 11,275,777 B2
(45) Date of Patent: Mar. 15, 2022

(54) METHODS AND SYSTEMS FOR GENERATING TIMELINES FOR ENTITIES

(71) Applicant: INTERNATIONAL BUSINESS MACHINES CORPORATION, Armonk, NY (US)

(72) Inventors: Christopher Ackermann, Fairfax, VA (US); Charles Beller, Baltimore, MD (US); Michael Drzewucki, Woodbridge, VA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 211 days.

(21) Appl. No.: 16/548,110

(22) Filed: Aug. 22, 2019

(65) Prior Publication Data
US 2021/0056131 A1 Feb. 25, 2021

(51) Int. Cl.
*G06F 16/30* (2019.01)
*G06F 16/383* (2019.01)
*G06F 16/332* (2019.01)
*G06F 16/338* (2019.01)

(52) U.S. Cl.
CPC .......... *G06F 16/383* (2019.01); *G06F 16/332* (2019.01); *G06F 16/338* (2019.01)

(58) Field of Classification Search
CPC .... G06F 16/332; G06F 16/338; G06F 16/383; G06F 9/542
See application file for complete search history.

(56) References Cited

U.S. PATENT DOCUMENTS

| | | | |
|---|---|---|---|
| 7,730,085 B2 | 6/2010 | Hassan et al. | |
| 8,131,540 B2 | 3/2012 | Marchisio et al. | |
| 8,356,248 B1* | 1/2013 | Killalea | G06Q 30/0601 715/273 |
| 8,849,809 B1* | 9/2014 | Seshadri | G06Q 10/00 707/725 |
| 9,239,830 B2 | 1/2016 | Gopalakrishnan et al. | |
| 9,369,536 B1* | 6/2016 | Holtzclaw | G06Q 50/01 |
| 9,886,665 B2 | 2/2018 | Chen et al. | |

(Continued)

OTHER PUBLICATIONS

Article entitled "Credibility Investigation of Newsworthy Tweets Using a Visualising Petri Net Model", by Torky et al., dated Oct. 12, 2016 (Year: 2016).*
Article entitled "MediaRank: Computational Ranking of Online News Sources", by Ye et al., dated May 12, 2019. (Year: 2019).*

(Continued)

*Primary Examiner* — Mahesh H Dwivedi
(74) *Attorney, Agent, or Firm* — Griffiths & Seaton PLLC

(57) ABSTRACT

Embodiments for generating a timeline associated with an entity are provided. A plurality of events referenced in a corpus are identified. Each of the plurality of events is associated with an entity. An event time is determined for each of the plurality of events based on information associated with at least one reference to the respective event within the corpus. A score is calculated for each of the plurality of events based on at least one of a number of references to the respective event within the corpus and information associated with a user. A timeline for at least some of the plurality of events is generated based on the calculated scores of the plurality of events and the determined event time for each of the plurality of events.

21 Claims, 6 Drawing Sheets

(56) References Cited

U.S. PATENT DOCUMENTS

| | | | | |
|---|---|---|---|---|
| 2014/0129559 | A1* | 5/2014 | Estes | G06F 16/245 |
| | | | | 707/737 |
| 2015/0186532 | A1* | 7/2015 | Agarwal | G06F 16/951 |
| | | | | 707/722 |
| 2016/0004667 | A1* | 1/2016 | Chakerian | G06F 16/285 |
| | | | | 715/277 |
| 2017/0277738 | A1 | 9/2017 | Danka et al. | |
| 2017/0351754 | A1* | 12/2017 | Devarakonda | G06F 40/30 |
| 2018/0305017 | A1* | 10/2018 | Myslinski | G06Q 10/06 |
| 2019/0005392 | A1 | 1/2019 | Yang et al. | |
| 2019/0102614 | A1* | 4/2019 | Winder | G06F 40/295 |
| 2019/0163794 | A1* | 5/2019 | Smith | G06F 16/24575 |

OTHER PUBLICATIONS

Li, DingCheng et al., "ERD-MedLDA: Entity Relation Detection using Supervised Topic Models with Maximum Margin Learning", Natural Language Engineering, Cambridge, England, Cambridge University Press, vol. 18, pp. Apr. 2012, first available Sep. 23, 2012, retrieved May 1, 2019, 4L52 PM EST.

McCallum et al., Joint Group and Topic Discovery from Relations and Text, Lecture Notes in Computer Science, 4503, LNCS, Conference paper, ICML 2006 Workshop on Statistical Network Analysis at the 23rd Int. Conf. on Machine Learning, (ICML '06), pp. 28-44 (presented circa Jun. 29, 2006, Pittsburgh, PA, USA Published Dec. 1, 2007 by Springer-Verlag, accessed May 8, 2019, 4:05 PM EST.

Wang, Xuerui et al., "Group and Topic Discovery from Relationships and their Attributes", published Aug. 21, 2015 (9 Pages).

* cited by examiner

METHODS AND SYSTEMS FOR GENERATING TIMELINES FOR ENTITIES

GOVERNMENT LICENSE RIGHTS TO CONTRACTOR-OWNED INVENTIONS MADE UNDER FEDERALLY SPONSORED RESEARCH AND DEVELOPMENT

This Invention was made with Government support under Contract No. 2018-18010800001 awarded by the United States Government. The Government has certain rights in the invention.

BACKGROUND OF THE INVENTION

Field of the Invention

The present invention relates in general to computing systems, and more particularly, to various embodiments for generating timelines for entities by identifying events associated with the entities in documents.

Description of the Related Art

Computing systems (and/or search algorithms) are often used to search various corpora (one or more corpus), such as one or more text-based documents, spreadsheets, etc., for references to (or mentions of) names (or other identifying terms) of entities (e.g., individuals/people, organizations, objects, places, etc.). With some systems, the results are provided to the user in document "clusters" (or "bin" data structures or "bins"), which may include the entity name and a collection of documents (and/or excerpts of documents) that include references to the entity, perhaps along with other information, such as entities that are determined to be related to the target (or intended) entity.

However, in order for a user to find out any significant information about the entities, they must typically read or search through the documents (or excerpts of documents) in the bins. Such a process may be cumbersome and time consuming.

SUMMARY OF THE INVENTION

Various embodiments for generating a timeline associated with an entity, by a processor, are provided. A plurality of events referenced in a corpus are identified. Each of the plurality of events is associated with an entity. A score is calculated for each of the plurality of events based on at least one of a number of references to the respective event within the corpus and information associated with a user. An event time is determined for each of the plurality of events based on information associated with at least one reference to the respective event within the corpus. A timeline for at least some of the plurality of events is generated based on the calculated scores of the plurality of events and the determined event time for each of the plurality of events.

In addition to the foregoing exemplary embodiment, various other system and computer program product embodiments are provided and supply related advantages. The foregoing Summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
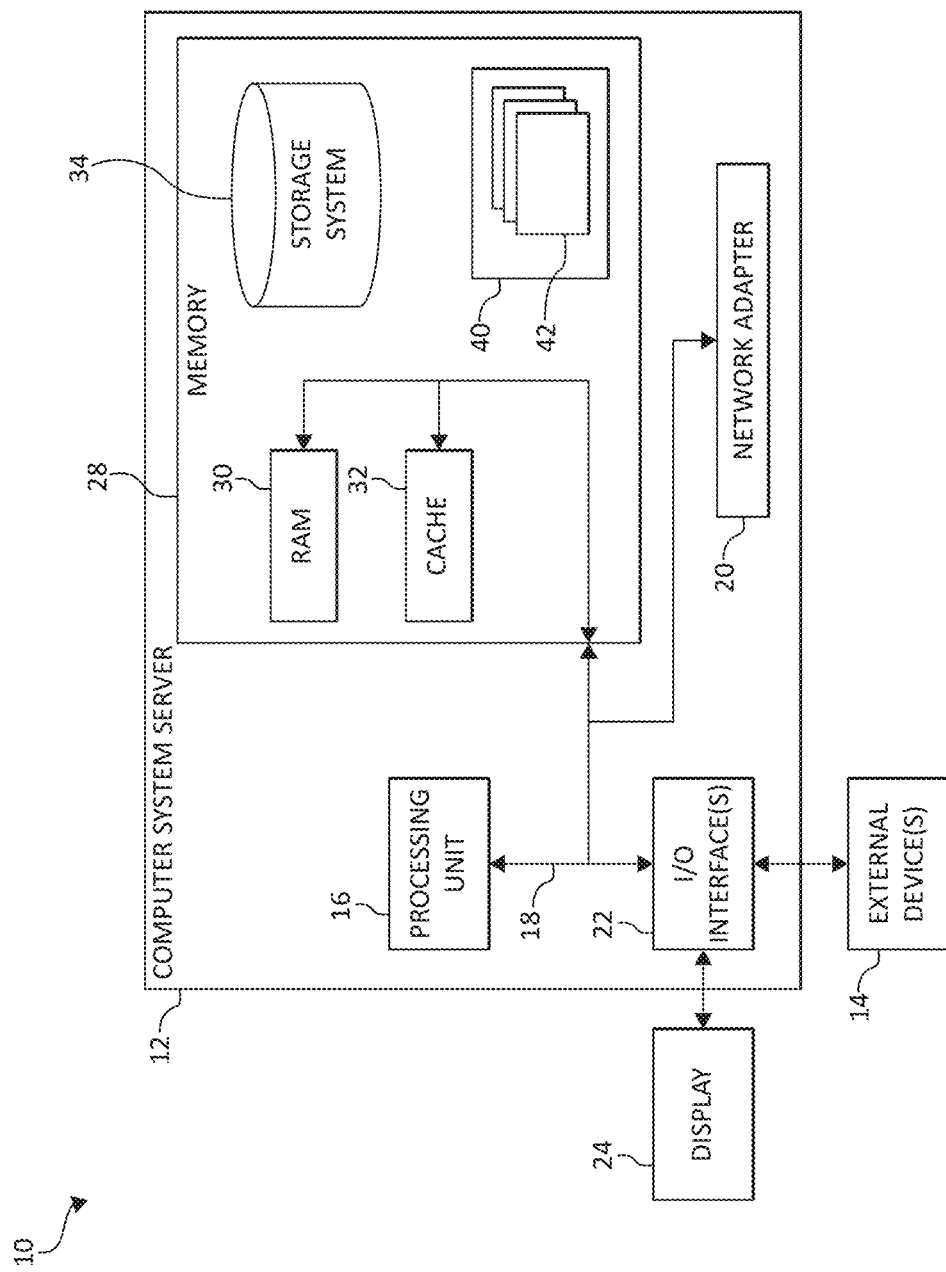
FIG. 1 is a block diagram depicting an exemplary computing node according to an embodiment of the present invention.

As discussed above, computing systems (and/or search algorithms) are often used to search various corpora (one or more corpus), such as one or more text-based documents, spreadsheets, etc., for references to (or mentions of) names (or other identifying terms) of entities (e.g., individuals/people, organizations, objects, places, etc.). With some systems, the results are provided to the user in document "clusters" (or "bin" data structures or "bins"), which may include the entity name and a collection of documents (and/or excerpts of and/or passages within documents) that include references to the entity, perhaps along with other information, such as entities that are determined to be related to the target (or intended) entity.

In some instances, the passages (and/or the bin in which they are included) are assigned labels based on predefined categories of interest for a user. For example, a user may want to focus on the business related activities of an entity, while another user may want to focus on the entity's overseas activities. In such instances, the bins may be labeled with the respective categories, and key terms that indicate relevance to the selected categories may be highlighted. In practice, the bins may be displayed to the user who can search across multiple bins that are returned in a query or navigate from a high level view of a bin to its details (e.g., passages and relationships).

However, in order for a user to find out any significant information about the entities, they must typically read or search through the documents (or excerpts of documents) in the bins. Such a process may be cumbersome and time consuming. Although some sources of information sources (e.g., websites) capture or list significant events or time spans in separate sections, allowing users to quickly skim the "headlines" to identify the most important events in that entity's life, such content is typically curated and requires many contributors, and significant resources, to maintain.

As such, in at least some situations, it would be helpful to have the "highlights" (or at least significant events) of an entity's (or entities') life or existence automatically identified and provided to the user when the results of such searches are presented.

To address these needs and/or the shortcomings in the prior art, in some embodiments described herein, methods and/or systems are disclosed that, for example, generate a timeline (or timeline view) of (or for) at least one entity, which may be tailored to an analytical focus of a user (or users). The timeline may be generated from the output of an entity discovery system and a set of topic labels and designed to facilitate the user learning about the entity.

In some embodiments, the entity timeline is generated (or built) to illustrate (or capture) the most significant (or relatively significant) events in the entity's life (or existence) as indicated by/in the various documents in the searched corpus. In some embodiments, this process is applied to bins that have been identified using a disambiguation approach that includes entity discovery, alignment, and ranking. The methods and systems described herein may enrich the bins and enable the user to more quickly gain insight into the identities (or entities) represented by the bins.

The timeline for a bin (or entity) may be extracted or generated using a multi-step process that involves clustering events within the contents of a bin and generating summaries (or descriptions) for each of the event clusters (or events). The timeline may be customized to specific users (e.g., users utilizing the system/performing searches) by taking into account labeling information that is applied to passages or excerpts of the document and information associated with the users (e.g., subjects, topic, etc. associated with the users).

In some embodiments, a user initially queries a retrieval system (or search module) using a query name (or enters a name of an entity or target/intended entity to be searched for). Mentions of (or references to) that name (perhaps accounting for typographical and/or spelling errors) are retrieved from (or identified within) the appropriate corpus (i.e., the one or more document to be searched), as will be appreciated by one skilled in the art. However, it should be understood that in some embodiments this process may already have been performed utilizing an appropriate retrieval/search system, the results of which are retrieved and/or identified by a system performing the functionality described herein.

In some embodiments, event clusters (or events) are determined from (or identified within) the documents within the corpus (or excerpts thereof) that include references to the entity. An event cluster may include a set of passages that discuss (or reference, mention, etc.) a specific, distinguishable event associated with the identity (or entity) represented by a bin of search results. Event clusters may be identified using any available clustering technique, such as hierarchical agglomerative clustering, as is commonly understood. Features that are taken into account for clustering may include, for example, the passage text and the topic labels that are applied to a passage (e.g., which may be defined within/by a user profile), which indicate relevance to the user's analytic focus. However, it should be understood that other features may be utilized in other embodiments. By taking passage labels into account, the event clusters are tailored to the specific user.

With some bins, the number of extracted event clusters may be relatively large and difficult to manage. As such, in some embodiments, the event clusters (or events) may be ranked or scored. The scoring of the event clusters may be based on the number of independent reports or the number of documents/sources that reference the event (perhaps along with a weighting applied to each of the documents/sources) and/or the relevance of the event cluster to the particular user (e.g., based on information associated with the user, such as user-defined labels). This may ensure that the resulting timeline is relevant to a user's analytic focus. The top n event clusters (e.g., 10, 20, etc. event clusters, perhaps based on configurable setting) may be selected to be utilized in later processing steps (e.g., to generate the timeline). However, in some embodiments, a predetermined threshold may (also) be implemented such that only the events with scores above the threshold are utilized.

In some embodiments, a summary (or description) is generated for each of the (selected) event clusters (or events). That is, an event cluster may include all of the passages (or excerpts) that have been identified to be associated with a particular event of interest. Conventionally, the user would have to read through the passages to understand the general topic of the respective event. As such, in some embodiments, to enable the user to quickly gain insight into the various events (as identified by the event clusters), a summary of the identified passages or events is generated.

A date (or time of occurrence) may be determined for each of the events (or at least those of the events that are selected as described above) based on information associated with the document(s) that include references to the events. For example, the date/time may be determined based on the date of publication of specific documents and/or explicit date/time references within the documents. The determined dates may be utilized (or displayed) in the generated timeline(s), but may also be used to establish the order among the identified events.

The timeline (and/or a representation thereof) may then be generated and provided to the user (e.g., rendered by a rendering device, such as a display screen/device), perhaps along with the search results. In some embodiments, the events are graphically laid out in such a way to facilitate the user in quickly gaining an understanding of the various events associated with the entity and facilitate further research.

As such, in some embodiments, timelines may be generated which include only entity-specific passages and relationships (or events). The timelines may be tailored to a user's analytic focus via the incorporation of profile defined topic labels (and/or other information associated with the user(s)). The events (or event clusters) may be ranked or scored based on, for example, a weighted number of reporting sources and/or relevance to a user's topics or labels. While other approaches cluster documents primarily based on dates, in at least some embodiments described herein, passages are clustered and a rich set of contextual information is taken into account. As a result, multiple events that are described in a single document may be differentiated as being significant and separately identified.

In some embodiments, at least some of the functionality described herein is performed utilizing a cognitive analysis. The cognitive analysis may include classifying natural language, analyzing tone, and analyzing sentiment (e.g., scanning for keywords, key phrases, etc.) with respect to, for example, content and communications sent to and/or received by users, and/or other available data sources. In some embodiments, natural language processing (NLP), Mel-frequency cepstral coefficients (MFCCs) (e.g., for audio content), and/or region-based convolutional neural network (R-CNN) pixel mapping (e.g., for images/videos), as are commonly understood, are used. As such, it should be understood that the methods/systems described herein may be applied to content other than text-based (or alphanumeric) content but also audio content and/or images/videos (e.g., an event associated with an entity is referenced in an audio and/or video file).

The processes described herein may utilize various information or data sources associated with users (e.g., users who provide search queries and/or entities) and/or the content (e.g., the document(s), file(s), etc. within the corpus). With respect to users, the data sources may include, for example, any available data sources associated with the user. For example, in some embodiments, a profile (e.g., a cognitive profile) for the user(s) may be generated. Data sources that may be use used to generate a cognitive profile for the user(s) may include any appropriate data sources associated with the user that are accessible by the system (perhaps with the permission or authorization of the user). Examples of such data sources include, but are not limited to, communication sessions and/or the content (or communications) thereof (e.g., phone calls, video calls, text messaging, emails, in person/face-to-face conversations, etc.), a profile of (or basic information about) the user (e.g., job title, place of work, length of time at current position, family role, etc.), a schedule or calendar (i.e., the items listed thereon, time frames, etc.), projects (e.g., past, current, or future work-related projects), location (e.g., previous and/or current location and/or location relative to other users), social media activity (e.g., posts, reactions, comments, groups, etc.), browsing history (e.g., web pages visited), and online purchases. The cognitive profile(s) may be utilized to, for example, determine or specify subjects, interests, topics, labels, analytical areas of focus, etc. of the user (or users), which may utilized as described herein, identify events associated with entities, and/or identify target/intended entities of the user(s).

As such, in some embodiments, the methods and/or systems described herein may utilize a "cognitive analysis," "cognitive system," "machine learning," "cognitive modeling," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, the generating of timelines for (or of) entities, as described herein. Utilizing the models, the performance (or operation) of the system (e.g., utilizing/based on new inputs) may be predicted and/or the performance of the system may be optimized by investigating how changes in the input(s) effect the output(s). Feedback received from (or provided by) users and/or administrators may also be utilized, which may allow for the performance of the system to further improve with continued use.

It should be understood that the embodiments described herein may be applied to any type of entity. That is, although some embodiments described herein are described with respect to individuals (and/or given/family names, nicknames, alternative names, aliases, etc. thereof), the methods/systems described herein may be applied to the names (or other descriptive terms) of any type of entity, such as organizations, objects, places, etc.

It should also be understood that as used herein, the term "computing node" (or simply "node") may refer to a computing device, such as a mobile electronic device or a desktop computer, and/or an application, such a chatbot, an email application, a social media application, a web browser, etc. In other words, as used herein, examples of computing nodes include, for example, computing devices such as mobile phones, tablet devices, desktop computers, or other devices, such as appliances (IoT appliances) that are owned and/or otherwise associated with individuals (or users), and/or various applications that are utilized by the individuals on such computing devices.

In particular, in some embodiments, a method for generating a timeline associated with an entity, by a processor, is provided. A plurality of events referenced in a corpus are identified. Each of the plurality of events is associated with an entity. A score is calculated for each of the plurality of events based on at least one of a number of references to the respective event within the corpus and information associated with a user. An event time is determined for each of the plurality of events based on information associated with at least one reference to the respective event within the corpus. A timeline for at least some of the plurality of events is generated based on the calculated scores of the plurality of events and the determined event time for each of the plurality of events.

A representation of the generated timeline may be caused to be rendered by a rendering device. At least one of the identifying of the plurality of events and the calculating of the score for each of the plurality of events may be performed utilizing a cognitive analysis.

The identifying of the plurality of events may be based on the information associated with the user. The information associated with the user may include at least one subject associated with the user.

A description for each of the plurality of events may be generated. The generated timeline may include the generated description for each of the at least some of the plurality of events. The calculating of the score for each of the plurality of events may be based on a number of documents in the corpus that include a reference to the respective event.

The information associated with the at least one reference to the respective event within the corpus may include information associated with a document within the corpus that includes the at least one reference to the respective event. The information associated with the document may include at least one of a date of publication for the document and a reference to a date within the document.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in vehicles, such as automobiles, aircraft, watercrafts, etc. However, in some embodiments, some of the components depicted in FIG. 1 may be located in a computing device in, for example, a satellite, such as a Global Position System (GPS) satellite. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
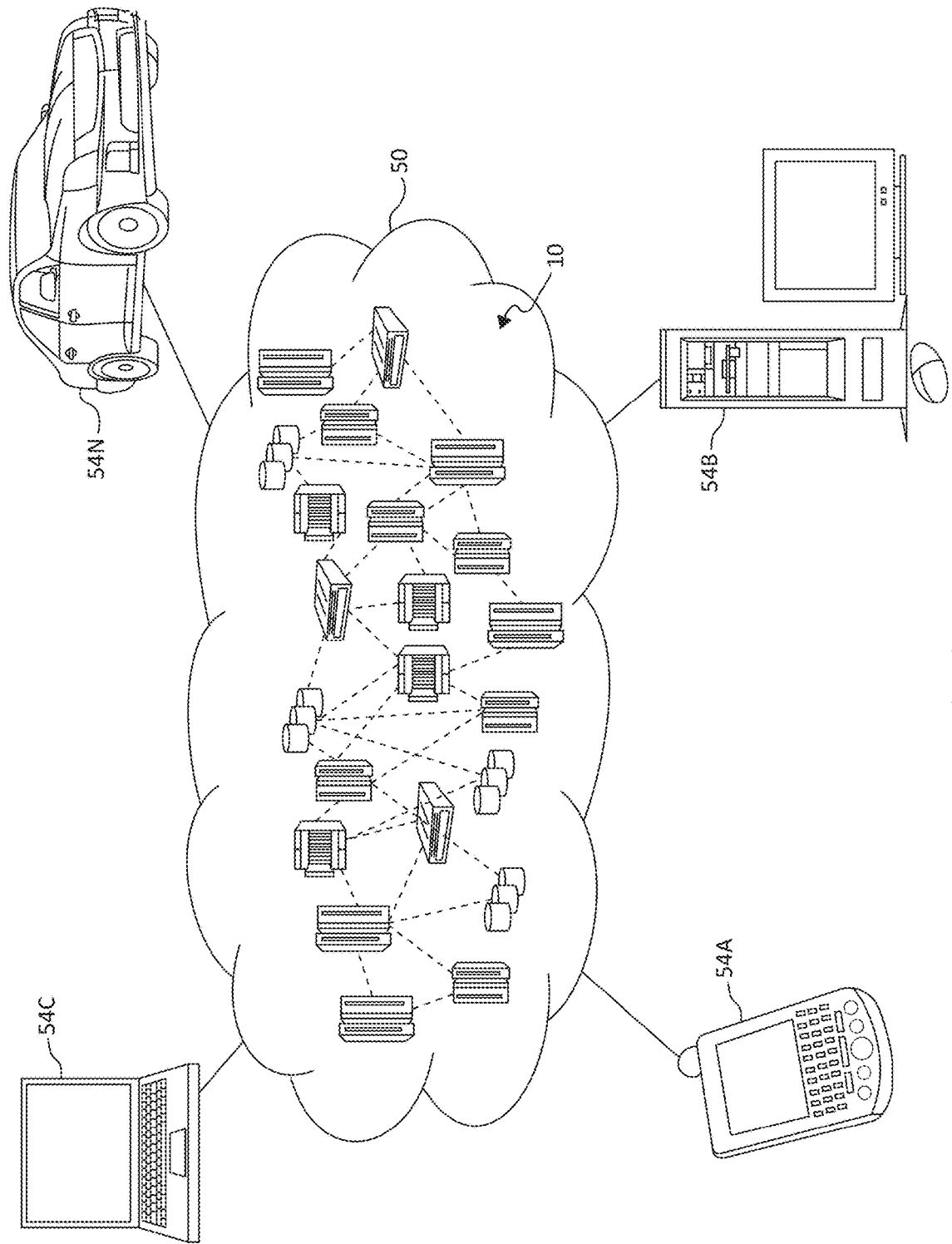
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular (or mobile) telephone or PDA 54A, desktop computer 54B, laptop computer 54C, and vehicular computing system (e.g., integrated within automobiles, aircraft, watercraft, etc.) 54N may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
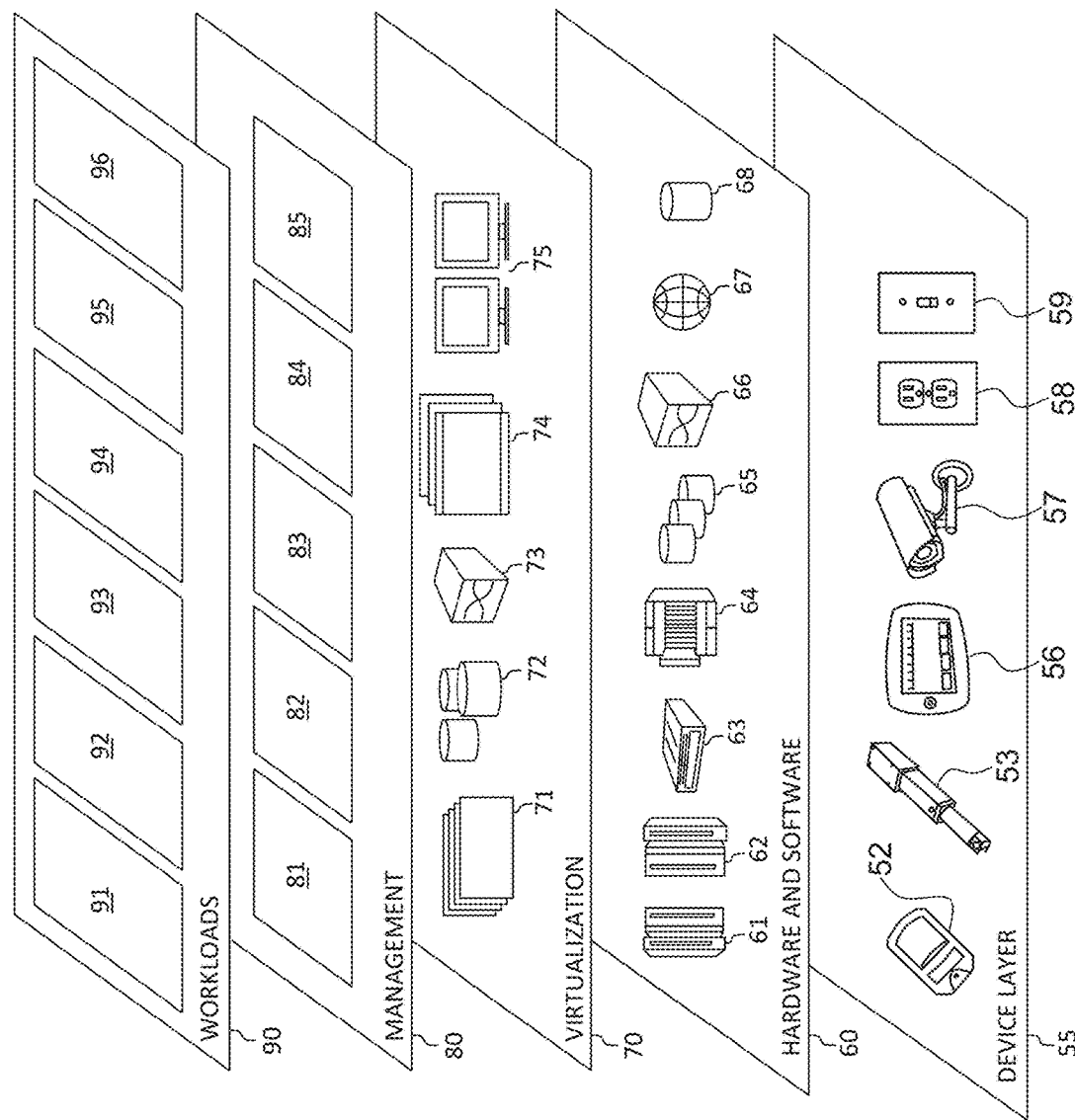
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator, washer/dryer, or air conditioning unit, and a wide variety of other possible interconnected devices/objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for generating timelines for entities, as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, in some embodiments, methods and/or systems for generating a timeline (or timeline view) of (or for) at least one entity, which is tailored to an analytical focus of a user (or users). The timeline may be generated from, for example, the output of an entity discovery system and a set of topic labels and designed to facilitate the user learning about the entity. In some embodiments, the entity timeline is generated (or built) to illustrate (or capture) the most significant (or relatively significant) events in the entity's life (or existence) as indicated by/in the various documents in the searched corpus. In some embodiments, this process is applied to bins (or clusters) that have been identified using a disambiguation approach that includes entity discovery, alignment, and ranking. The methods and systems described herein may enrich the bins and enable the user to more quickly gain insight into the identities (or entities) represented by the bins.

Figure 4:
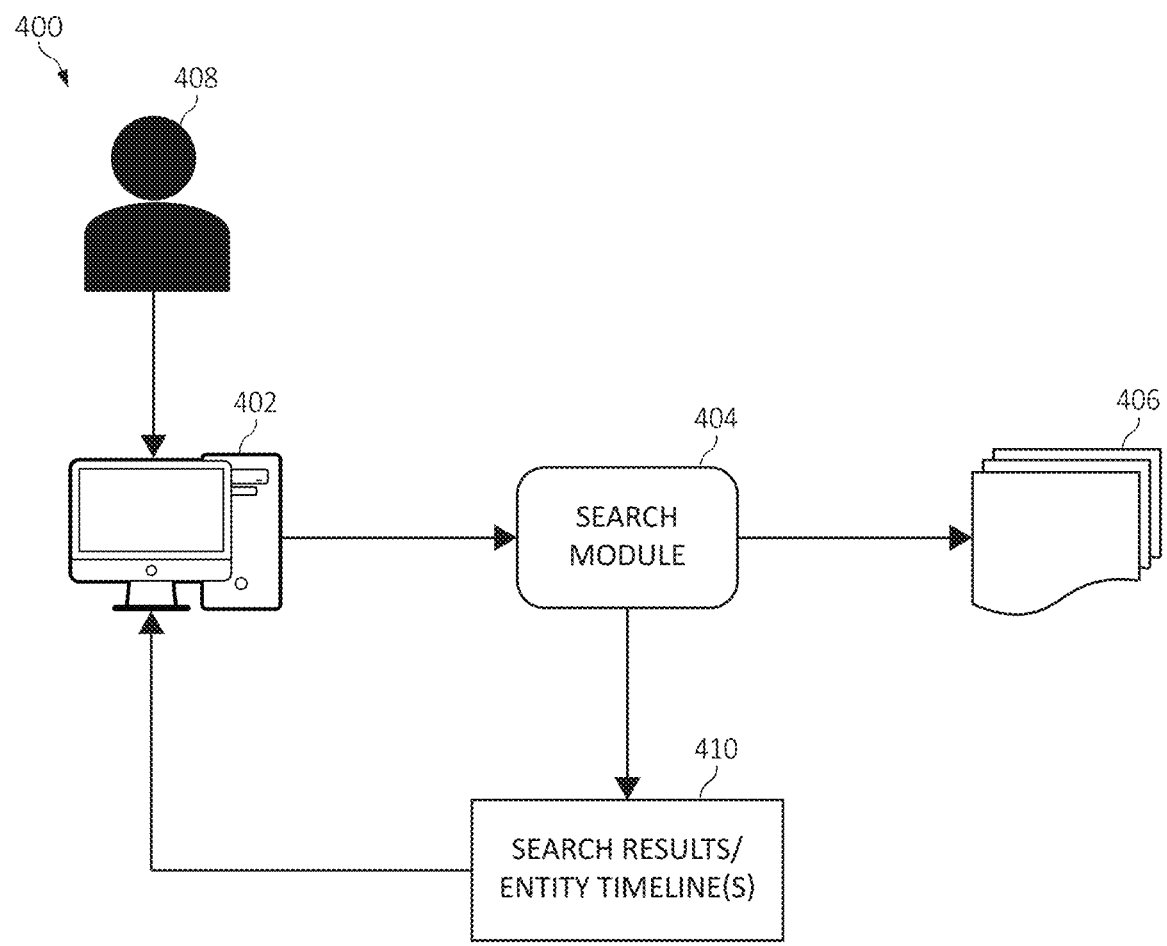
FIG. 4 is a block diagram a computing environment according to an embodiment of the present invention.

FIG. 4 illustrates an exemplary computing environment 400 according to some embodiments of the present invention. In the depicted environment, the computing environment 400 includes a computing device 402, a search module 404, and a corpus 406.

The computing device (or node) 402 may be any suitable computing device, such as those described above (e.g., a desktop PC, a mobile electronic device, etc.), which may be utilized by a user (or individual) 408 to, for example, initiate a search of the corpus and/or view/consume the results thereof. However, it should be understood that the methods described herein may be initiated by a computing device (or system). For example, the methods described herein may be automatically initiated in response to previous events, such as an entity search being performed and/or the results of such a search being received or detected, based on a schedule, etc.

The search module 404 may include (and/or be implemented with) any suitable computing device or system, such as those described above, and may be configured to perform the searching of corpora, generating timelines, and/or any associated processes (e.g., a cognitive analysis) and return search results and/or entity timeline(s) 410 to the user 408 (e.g., via the computing device 402), as described above. The corpus 406 may include one or more of any type of suitable document, file, database, etc., such as unstructured documents, web sites, word processing documents, spreadsheets, electronic communications (e.g., emails, text messages, etc.), audio/video files, etc., that may be accessed and/or is/are searchable by the computing device 402 and/or the search module 404. It should be noted that in embodiments in which a search was previously performed, the corpus 406 shown in FIG. 4 may correspond to the results of the search (e.g., identified entity references, excerpts/portions of the respective documents, etc.).

In some embodiments, the computing device 402, the search module 404, and/or the corpus 406 may be integrated into common computing devices and/or located locally. For example, the search module 404 may be integrated within the computing device 402. However, in some embodiments, the components shown in FIG. 4 may be remote from each other and in operable communication via any suitable communication network (e.g., the Internet).

In some embodiments, if an entity search has not been performed and/or results of such a search are not available to the search module 404 and/or the computing device 402, the user 408 may provide a query or enter a name of an entity (or target/intended entity) to be searched for to the search module 404 (e.g., via the computing device 402). The corpus 406 may then be searched for the entity name(s) using any suitable search algorithm, such as a string-searching algorithm, as is commonly understood. Additionally, embodiments described herein may utilize any suitable solution to account for typographical and spelling errors in (and/or alternative spellings of) entity names provided by users (and/or discovered alternative names), such as string metrics and string matching, as is commonly understood. Further, embodiments described herein may utilize any suitable solution to account for the usage of pronouns (e.g., he, she, they, it, etc.) in place of more complete versions of the entity names.

The references to the target entity within the corpus 406 may then be identified and/or extracted, perhaps along with excerpts or portions of the respective document(s) within the corpus 406. In some embodiments, the results are clustered with, for example, each bin representing a particular entity or references to a particular entity with a name (or other identifying term) that matches (or closely matches) the target entity. The results and/or bins may then be analyzed and an entity timeline may be generated as described below.

In some embodiments, each bin and/or the documents (and/or appropriate excerpts of the documents) therein are analyzed to identify and/or extract event clusters (and/or events) that are referenced within the documents. Event clusters may be considered to be a set of passage or excerpts that discuss (or reference) a specific distinguishable event associated with the identity represented by the respective bin. Event clusters may be identified using known clustering technique, such as hierarchical agglomerative clustering. The features of the clustering algorithm utilized may include the date when the passage (and/or the respective document) was published, explicit date mentions within the passage (and/or document), the text of the passage, related entities referenced in the passage, and/or the labels (e.g., user-defined labels) of the passage (and/or document). These features, particularly the use of user-defined labels, may enable the clustering algorithm to highlight events that pertain to a particular user's analytic focus. This clustering approach may distinguish multiple events that are discussed in the same document if there is enough contextual information provided via the passage text, the related entities, and the labels.

In some embodiments, the identification of events (or event clusters) is performed utilizing a NLP technique. For example, particular types of words, phrases, etc. may be identified and/or extracted from the documents (or portions of the documents), such as noun phrases, verb phrases, keywords, key phrases, particular sentence structures, etc., which are determined to be indicative of the occurrence of events. These words/phrases may determined to be associated with a particular entity if they are located within a within a predetermined window (or "distance" or "text distance") of a reference to the entity within the document(s). For example, such words/phrases may have to occur/appear or be located within the same sentence (or paragraph) as the reference, within the phrase (or sentence, clause, etc.) before and/or after the references, and/or be determined to be the closest (or immediate) instance of such a word/phrase to the reference.

The event clusters (or events) may then be ranked with respect to interest (and/or value) and/or relevance. In some embodiments, a score (e.g., a numerical number) is calculated for each of the event clusters, which may be based on the number of documents that include a reference to the event and/or the relevance of the event to the particular user(s) (e.g., based on information associated with the user, user-defined labels, etc.). However, in some embodiments, "grades" (e.g., "high," "low," etc.) may be determined or assigned.

With respect to the number of (independent) documents that include a reference (or references) to the event, a relatively high number of document may indicate the event is more interesting and/or more important with respect to the entity's life/existence, particularly if the references are located in a variety of sources. In some embodiments, the documents (or sources) are weighted, which is utilized in calculating the score. For example, a single report of (or reference to) a particular event from a highly respected newspaper may be considered to be more interesting/valuable than multiple reports from less respected newspapers (e.g., tabloids). The weighting assigned to various documents/sources may be determined by, for example, searching/analyzing various types of information, such as the number of times that document/source is cited by other documents/sources and reporting on the objectivity and/or accuracy of the documents/sources (e.g., via websites, online databases, etc.). In some embodiments, the (portion of) score calculated in this regard is determined as:

$$interest\_\# = SUM\_sources(weight(source) * num\_reports(source))$$

With respect to the relevance of the event to the particular user(s), topic labels from a user's (or users') profile(s) (or other information associated with the users(s)) may be assigned to passage content along with associated confidence scores and, in some embodiments, user defined weights for the relevance of different topics. In some embodiments, the (portion of) score calculated in this regard is determined as:

$$interest\_labels = SUM\_labels(weight(label) * confidence(label, cluster\_text))$$

Event clusters (or events) may then ranked (or scored) by a combination of the two factors described above. Such may be performed in various manners, however, in some embodiments, a weighted summation is utilized. In some embodiments, a particular number (e.g., configurable via a systems setting or preferences functionality) of the highest scoring event clusters (e.g., the top n event clusters) are selected and utilized as described below. It should be noted that the weighting the event clusters by relevance to user-defined topic labels may ensure that the resulting timeline is tailored to the analytic focus of the user(s). In some embodiments, any events that have calculated scores that are below a predetermined threshold are removed from the list (and thus not utilized to generate the timeline described below). In some instances, such may result in all of the events being removed from the list. In such cases, no timeline may be generated for the entity.

In some embodiments, a description (or summary) for each of the (selected) event clusters (or corresponding event) is generated. The generate description may include a sentence, phrase, etc. that utilizes the most significant terms found in the event cluster (and/or the respective portions of the documents. Any suitable manner for generating the descriptions may be utilized. In some embodiments, the process involves comparing the relevant sentences or phrases to each other to determine which is most similar to the others, as is commonly understood, which is then selected/utilized as (or in) the description. However, the description may (also) be generated by identifying and/or extracting various descriptors (e.g., noun phrases, verb phrases, etc.) from appropriate portions of the documents (or portions of the documents).

In some embodiments, a date or time (i.e., a date/time of occurrence) is determined (or identified) for each of the (selected) event clusters (or events), perhaps based on information associated with at least one reference to the respective event within the corpus (or respective document(s)). The process may involve identifying a representative set of dates (or single time/date) for each event based on, for example, the dates on which the respective passages (and/or documents) were published (e.g., as indicated within the document and/or metadata associated with the document) and/or explicit date mentions (or references) in the appropriate passages or portions of the documents. In some embodiments, the earliest identified date is utilized as the representative date. In other embodiments, a mean or average date is generated from the set of dates. As another example, a date "span" is identified, which may utilize/include the earliest identified date as a starting point and a later (e.g., last) date as an end point.

In embodiments that utilize the earliest date in an identified set of dates, such may be utilized based on the reasoning that events are typically reported closely to the time at which they occur. Additional reporting then follows, which either repeats the initial report or provides additional context. Since the event date is necessarily closest to the date of its first occurrence in reporting/documents, the earliest date from all of the passages in the event cluster may be selected as the event date.

The above may then be utilized to generate a timeline (and/or a representation of a timeline) for the entity associated with the bin, which illustrates (or indicates) events that are (at least relatively) relevant to the specific user(s). For each event, the timelines includes the date (or time) of the events, along the summary (or description) of the events, and perhaps the labels (e.g., user-defined labels) identified in passages associated with that event (which may be considered to be part of the summary/description). The labels may aid the user(s) in quickly gauging the relevance to their particular focus area or interests. The timeline may then be provided to the user, perhaps in conjunction with the presentation of the results for the entity search (e.g., the bin(s)).

For example, the timeline may be caused to be rendered by any suitable rendering device, such as a display device (e.g., a computing device display, a television, etc. via an electronic communication, pop-up window, etc.) and/or a speaker (e.g., at least portions of the timeline may be rendered audibly), perhaps along with (other) results of the search (e.g. other bins). In some embodiments, each event may be "expanded" (e.g., via user interaction, such as by "clicking" with a mouse) to reveal the passages associated with the event. Keywords (or other terms, phrases, etc.) that led to labels being applied may also be indicated or highlighted.

Figure 5:
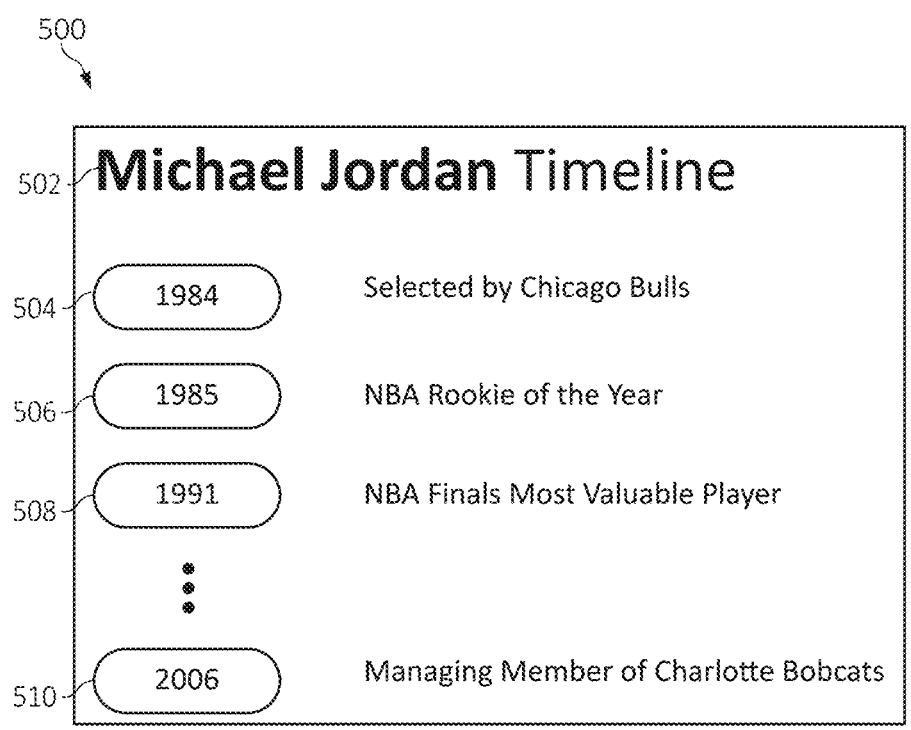
FIG. 5 is a view of an exemplary entity timeline according to an embodiment of the present invention.

FIG. 5 depicts an exemplary timeline (or a portion thereof) 500 for (or of) an entity according to an embodiment of the present invention. More specifically, FIG. 5 illustrates an exemplary timeline 500 associated with (and/or that has been generated for) a particular bin (or entity) within a set of search results. In the example shown, the target entity is "Michael Jordan," as indicated by/listed under/next to name of entity label (or section) 502. Of particular interest in FIG. 5 are date labels 504-510, which indicate (or list) the dates or event times (e.g., years) of events within the timeline 500 (e.g., listed in chronological order, with the earlier dates/events listed first/at the top). As shown, next to each of the date labels 504-510 is listed a description (or summary, labels, etc.) of the event(s) that occurred on the respective date. For example, the event listed next to date label 504 (e.g., "1984") is described as "selected by the Chicago Bulls," which corresponds to the event of the target entity being selected in that respective team in the draft of the corresponding professional sports association. It should be noted that although only four dates/events are shown in FIG. 5, different numbers (e.g., more or less) dates/events may be included in other embodiments.

In some embodiments, the user may interact with the timeline 500 to, for example, obtain additional information about the entity and/or the events. For example, the user may select one of the dates/events (e.g., by "clicking" on a date/event and/or description thereof with a mouse or otherwise selecting with a different user input device) which may cause additional information to be rendered (e.g., appropriate excerpts from the documents within the corpus, a more complete description of the event, etc.). It should be understood that in some embodiments a similar timeline may be generated/provided for each of the bins (and/or the associated entities) in the search results (e.g., other entities with names similar to that of the target entity). Additionally, although the timeline 500 shown in FIG. 5 is arranged in a "vertical" manner, other types/arrangements of timelines may be utilized/generated (e.g., horizontal timelines, purely text-based descriptions of events that include the appropriate dates, etc.).

Figure 6:
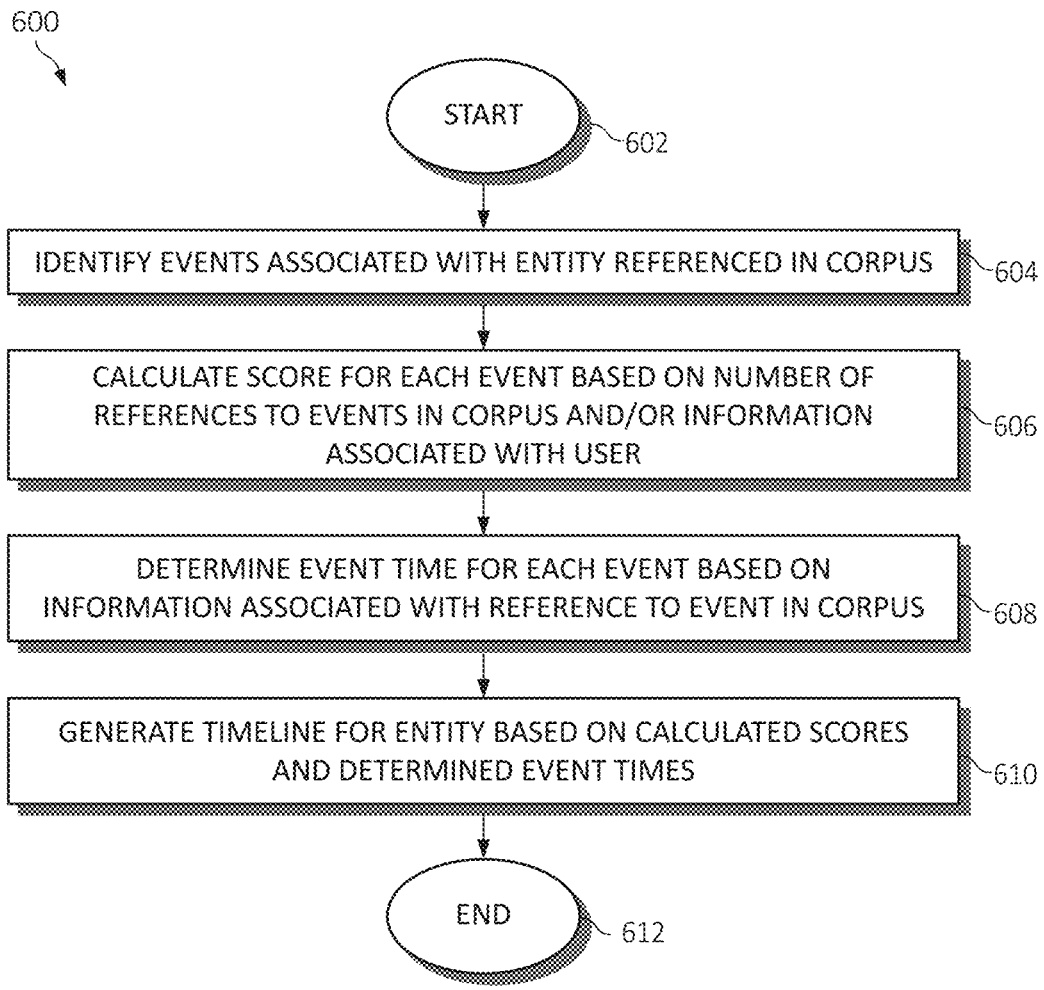
FIG. 6 is a flowchart diagram of an exemplary method for generating timelines for entities according to an embodiment of the present invention.

Turning to FIG. 6, a flowchart diagram of an exemplary method 600 for generating a timeline for an entity (or an entity timeline) is provided. The method 600 begins (step 602) with, for example, a search for references to a target entity within a corpus (e.g., one or more documents) being performed and/or results of such a search (e.g., bins) being made accessible by a computing device/system and/or search module, as described above.

A plurality of events (or event clusters) referenced in a corpus are identified (step 604). Each of the plurality of events may be associated with an entity. The identifying of the plurality of events may be based on information associated with the user. For example, the information associated with the user may include at least one subject associated with the user, such as user-defined labels, subjects, interests, etc. (e.g., indicated in a user profile).

A score is calculated for each of the plurality of events based on at least one of a number of references to the respective event within the corpus and information associated with a user (step 606). At least one of the identifying of the plurality of events and the calculating of the score for each of the plurality of events may be performed utilizing a cognitive analysis. The calculating of the score for each of the plurality of events may be based on a number of documents (e.g., independent, unique, separate etc. documents) in the corpus that include a reference to the respective event.

An event time is determined for each of the plurality of events based on information associated with at least one reference to the respective event within the corpus (step 608). The information associated with the at least one reference to the respective event within the corpus may include information associated with a document within the corpus that includes the at least one reference to the respective event. The information associated with the document may include at least one of a date of publication for the document and a reference to (e.g., an explicit mention of) a date within the document.

A timeline for at least some of the plurality of events is generated based on the calculated scores of the plurality of events and the determined event time for each of the plurality of events (step 610). A description (or summary) for each of the plurality of events may be generated, which may be included in the generated timeline, as described above.

Method 600 ends (step 612) with, for example, the generated timeline being provided to the user, perhaps along with the results of the search. For example, the timeline (or a representation thereof) may be caused to be rendered by a rendering device (e.g., a display device). In some embodiments, multiple timelines are generated, with each timeline being associated with a particular bin of the results of the search for the entity within the corpus. In some embodiments, feedback from users (e.g., early adopters and/or later uses) may also be utilized to improve the performance of the system over time.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for generating a timeline associated with an entity comprising:
    identifying a plurality of events referenced in a corpus, wherein each of the plurality of events is associated with an entity;
    calculating a score for each of the plurality of events based on a number of references to the respective event within the corpus and information associated with a user, wherein calculating the score includes assigning a weight to a source reporting the respective event within the corpus based on an identified number of times the source is cited by alternative sources to determine an accuracy of the source, wherein the score is calculated by summing, over all sources contributing to the number of references to the respective event, the weight of the source as a function of the number of references to the respective event by the source, and wherein those sources having a higher assigned weight contribute to the calculation of a higher score when calculating the score than those sources having a lower assigned weight notwithstanding whether those sources having the lower assigned weight include a higher number of the number of references to the respective event than those sources having the higher assigned weight;

determining an event time for each of the plurality of events based on information associated with at least one reference to the respective event within the corpus; and generating a timeline for at least some of the plurality of events based on said calculated scores of the plurality of events and said determined event time for each of the plurality of events.

2. The method of claim 1, further comprising causing a representation of said generated timeline to be rendered by a rendering device.

3. The method of claim 1, wherein the identifying of the plurality of events is based on the information associated with the user, and wherein the information associated with the user includes at least one subject associated with the user.

4. The method of claim 1, further comprising generating a description for each of the plurality of events, wherein said generated timeline includes said generated description for each of the at least some of the plurality of events.

5. The method of claim 1, wherein the calculating of the score for each of the plurality of events is based on a number of documents in the corpus that include a reference to the respective event.

6. The method of claim 1, wherein the information associated with at least one reference to the respective event within the corpus includes information associated with a document within the corpus that includes the at least one reference to the respective event, wherein the information associated with the document includes at least one of a date of publication for the document and a reference to a date within the document.

7. The method of claim 1, wherein at least one of the identifying of the plurality of events and the calculating of the score for each of the plurality of events is performed utilizing a cognitive analysis.

8. A system for generating a timeline associated with an entity comprising:

a processor executing instructions stored in a memory device, wherein the processor:

identifies a plurality of events referenced in a corpus, wherein each of the plurality of events is associated with an entity;

calculates a score for each of the plurality of events based on a number of references to the respective event within the corpus and information associated with a user, wherein calculating the score includes assigning a weight to a source reporting the respective event within the corpus based on an identified number of times the source is cited by alternative sources to determine an accuracy of the source, wherein the score is calculated by summing, over all sources contributing to the number of references to the respective event, the weight of the source as a function of the number of references to the respective event by the source, and wherein those sources having a higher assigned weight contribute to the calculation of a higher score when calculating the score than those sources having a lower assigned weight notwithstanding whether those sources having the lower assigned weight include a higher number of the number of references to the respective event than those sources having the higher assigned weight;

determines an event time for each of the plurality of events based on information associated with at least one reference to the respective event within the corpus; and generates a timeline for at least some of the plurality of events based on said calculated scores of the plurality of events and said determined event time for each of the plurality of events.

9. The system of claim 8, wherein the processor further causes a representation of said generated timeline to be rendered by a rendering device.

10. The system of claim 8, wherein the identifying of the plurality of events is based on the information associated with the user, and wherein the information associated with the user includes at least one subject associated with the user.

11. The system of claim 8, wherein the processor further generates a description for each of the plurality of events, wherein said generated timeline includes said generated description for each of the at least some of the plurality of events.

12. The system of claim 8, wherein the calculating of the score for each of the plurality of events is based on a number of documents in the corpus that include a reference to the respective event.

13. The system of claim 8, wherein the information associated with at least one reference to the respective event within the corpus includes information associated with a document within the corpus that includes the at least one reference to the respective event, wherein the information associated with the document includes at least one of a date of publication for the document and a reference to a date within the document.

14. The system of claim 8, wherein at least one of the identifying of the plurality of events and the calculating of the score for each of the plurality of events is performed utilizing a cognitive analysis.

15. A computer program product for generating a timeline associated with an entity, by a processor, the computer program product embodied on a non-transitory computer-readable storage medium having computer-readable program code portions stored therein, the computer-readable program code portions comprising:

an executable portion that identifies a plurality of events referenced in a corpus, wherein each of the plurality of events is associated with an entity;

an executable portion that calculates a score for each of the plurality of events based on a number of references to the respective event within the corpus and information associated with a user, wherein calculating the score includes assigning a weight to a source reporting the respective event within the corpus based on an identified number of times the source is cited by alternative sources to determine an accuracy of the source, wherein the score is calculated by summing, over all sources contributing to the number of references to the respective event, the weight of the source as a function of the number of references to the respective event by the source, and wherein those sources having a higher assigned weight contribute to the calculation of a higher score when calculating the score than those sources having a lower assigned weight notwithstanding whether those sources having the lower assigned weight include a higher number of the number of references to the respective event than those sources having the higher assigned weight;

an executable portion that determines an event time for each of the plurality of events based on information associated with at least one reference to the respective event within the corpus; and an executable portion that generates a timeline for at least some of the plurality of events based on said calculated scores of the plurality of events and said determined event time for each of the plurality of events.

16. The computer program product of claim 15, wherein the computer-readable program code portions further include an executable portion that causes a representation of said generated timeline to be rendered by a rendering device.

17. The computer program product of claim 15, wherein the identifying of the plurality of events is based on the information associated with the user, and wherein the information associated with the user includes at least one subject associated with the user.

18. The computer program product of claim 15, wherein the computer-readable program code portions further include an executable portion that generates a description for each of the plurality of events, wherein said generated timeline includes said generated description for each of the at least some of the plurality of events.

19. The computer program product of claim 15, wherein the calculating of the score for each of the plurality of events is based on a number of documents in the corpus that include a reference to the respective event.

20. The computer program product of claim 15, wherein the information associated with at least one reference to the respective event within the corpus includes information associated with a document within the corpus that includes the at least one reference to the respective event, wherein the information associated with the document includes at least one of a date of publication for the document and a reference to a date within the document.

21. The computer program product of claim 15, wherein at least one of the identifying of the plurality of events and the calculating of the score for each of the plurality of events is performed utilizing a cognitive analysis.

\* \* \* \* \*